United States Patent
Kim

(10) Patent No.: US 11,999,264 B2
(45) Date of Patent: Jun. 4, 2024

(54) CONTACTOR MANAGEMENT METHOD AND BATTERY SYSTEM PROVIDING METHOD

(71) Applicant: LG ENERGY SOLUTION, LTD., Seoul (KR)

(72) Inventor: Sookwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/768,889

(22) PCT Filed: Jul. 30, 2021

(86) PCT No.: PCT/KR2021/010007
§ 371 (c)(1),
(2) Date: Apr. 14, 2022

(87) PCT Pub. No.: WO2022/039409
PCT Pub. Date: Feb. 24, 2022

(65) Prior Publication Data
US 2024/0025298 A1    Jan. 25, 2024

(30) Foreign Application Priority Data

Aug. 20, 2020  (KR) .......... 10-2020-0104789

(51) Int. Cl.
*B60L 58/20* (2019.01)
*B60L 53/14* (2019.01)
*H02J 7/00* (2006.01)

(52) U.S. Cl.
CPC .............. *B60L 58/20* (2019.02); *B60L 53/14* (2019.02); *H02J 7/0032* (2013.01); *B60L 2240/12* (2013.01)

(58) Field of Classification Search
CPC ...... B60L 58/20; B60L 53/14; B60L 2240/12; H02J 7/0032
See application file for complete search history.

(56) References Cited

U.S. PATENT DOCUMENTS

2004/0230357 A1    11/2004  Kobayashi
2006/0220601 A1*   10/2006  Horii ................ B60L 1/14
                                                    318/109
(Continued)

FOREIGN PATENT DOCUMENTS

CN         108357360 A       8/2016
DE    10 2018 131 450 A1     6/2019
(Continued)

OTHER PUBLICATIONS

International Search Report for PCT/KR2021/010007 dated Nov. 16, 2021.
(Continued)

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

Disclosed is a contactor management method and a battery system providing the same, and the battery system includes: a main contactor connected between a battery pack and an external device; a pre-charge contactor connected to the main contactor; a voltage measurer measuring an operation voltage supplied to the main contactor; and a controller determining an open event of the main contactor based on a change of the operation voltage measured by the voltage measurer, wherein the controller, when the open event occurs, determines the level of the driving signal that controls the operation voltage to be applied to the main contactor in the driving mode in which the vehicle is running, and when the level of the driving signal is an enable
(Continued)

level, closes the main contactor after closing the pre-charge contactor and opens the pre-charge contactor after a predetermined time is elapsed in the state that the main contactor is closed.

11 Claims, 4 Drawing Sheets

(56) References Cited

U.S. PATENT DOCUMENTS

| | | | |
|---|---|---|---|
| 2013/0148251 A1* | 6/2013 | Iwashita | H02J 7/0031 |
| | | | 361/170 |
| 2017/0144554 A1* | 5/2017 | Mifsud | H01H 47/02 |
| 2018/0118319 A1* | 5/2018 | Kato | B63H 21/213 |
| 2018/0208079 A1 | 7/2018 | Noppakunkajorn et al. | |
| 2019/0176803 A1* | 6/2019 | Tabatowski-Bush | |
| | | | H01M 10/482 |
| 2019/0210481 A1* | 7/2019 | Ishida | B60L 53/62 |
| 2020/0124672 A1 | 4/2020 | Cho et al. | |
| 2020/0195016 A1* | 6/2020 | Kimoto | H02J 7/345 |

FOREIGN PATENT DOCUMENTS

| | | |
|---|---|---|
| EP | 2 822 132 A1 | 1/2015 |
| JP | 2005-176466 A | 6/2005 |
| JP | 3736933 B2 | 1/2006 |
| JP | 2009-284666 A | 12/2009 |
| JP | 2013-123285 A | 6/2013 |
| JP | 2013-248971 A | 12/2013 |
| JP | 5835009 B2 | 12/2015 |
| JP | 2018-71444 A | 5/2018 |
| JP | 2019-503162 A | 1/2019 |
| JP | 2019-122207 A | 7/2019 |
| KR | 10-0525651 B | 11/2005 |
| KR | 10-2010-0034102 A | 4/2010 |
| KR | 10-2017-0002298 A | 1/2017 |
| KR | 10-2017-0068159 A | 6/2017 |
| KR | 10-2017-0097481 A | 8/2017 |
| KR | 10-1776341 B1 | 9/2017 |
| KR | 10-2018-0008224 A | 1/2018 |
| KR | 10-2134825 B1 | 7/2020 |

OTHER PUBLICATIONS

Extended European Search Report for Application No. 21858496.9. dated Dec. 13, 2022.

* cited by examiner

CONTACTOR MANAGEMENT METHOD AND BATTERY SYSTEM PROVIDING METHOD

BACKGROUND OF THE INVENTION (a) Field of the Invention

TECHNICAL FIELD

This application claims priority to and the benefit of Korean Patent Application No. 10-2020-0104789 filed in the Korean Intellectual Property Office on Aug. 20, 2020, the entire contents of which are incorporated herein by reference.

The present invention relates to a method for managing a main contactor electrically connecting a battery and an external device and a battery system for providing the method.

BACKGROUND ART

Recently, as a part of environmental protection, research and interest in electric vehicles such as an HEV (Hybrid Electric Vehicle) or an EV (Electric Vehicle) are increasing. The electric vehicle may include a contactor for electrically connecting or disconnecting a battery and a load. When the contactor is closed, power is supplied from the battery to the load.

On the other hand, the contactor is closed when the driving voltage is supplied, and is opened when the driving voltage is not supplied. If the driving voltage temporarily fluctuates in an unintended situation for some reasons, the contactor may be opened momentarily. Due to the unintentional opening of the contactor, the control unit may automatically control the contactor to be closed again. At this time, when a DC-link load is large, the contactor may be damaged by an overcurrent (a high inrush current), and when the damage is large, it may be welded to a closed state (close) or an open state (open). Since the fused contactor cannot perform the opening or closing operation under the control of the control unit, a replacement is required.

Therefore, when the contactor is temporarily opened, a logic to control the contactor while reducing the damage is required.

DISCLOSURE

Technical Problem

The present invention provides a contactor management method for determining whether to maintain an open state or to re-close for a main contactor and a battery system for providing the method based on an operating state of a vehicle or a driving signal for controlling an operation voltage supplied to the main contactor when the main contactor is opened.

The present invention provides a contactor management method for performing a pre-charge by using a pre-charge contactor when the main contactor must be re-closed, and a battery system for providing the method.

Technical Method

A battery system according to an exemplary embodiment of the present invention includes: a main contactor connected between a battery pack and an external device; a pre-charge contactor connected to the main contactor; a voltage measurer measuring an operation voltage supplied to the main contactor; and a controller determining an open event of the main contactor based on a change of the operation voltage measured by the voltage measurer, wherein the controller, in response to the open event occurring, determines the level of the driving signal that controls the operation voltage to be applied to the main contactor in the driving mode in which the vehicle is running, and in response to the level of the driving signal being an enable level, closes the main contactor after closing the pre-charge contactor and opens the pre-charge contactor after a predetermined time is elapsed in the state that the main contactor is closed.

The controller may control the main contactor to maintain an open state in response to the level of the driving signal being a disable level as a determined result.

The controller may determine that the open event has occurred if the operation voltage supplied to the main contactor is not supplied.

The controller may determine the vehicle to be in the driving mode if the speed of the vehicle exceeds a predetermined reference speed, or if the gear shift of the vehicle is a reverse gear, a neutral gear, or a drive gear.

A driver receiving the driving signal from the controller and supplying the operation voltage to the main contactor according to the driving signal may be further included.

The controller may be a battery management system (BMS) controlling opening or closing of the main contactor by transmitting the driving signal to the driver.

The voltage measurer may be an analog-to-digital converter (ADC) converting the operation voltage into a digital signal to be transmitted to the controller.

A contactor management method according to an exemplary embodiment of the present invention as a method for managing a main contactor by controlling the main contactor connected between a battery pack and an external device and a pre-charge contactor connected to the main contactor through a controller includes: generating an open event in which the main contactor is opened; determining whether a vehicle is in a driving mode in which the vehicle is running if the open event occurs; determining a level of a driving signal controlling the operation voltage to be applied to the main contactor in the case of the driving mode; and closing the main contactor after closing the pre-charge contactor and opening the pre-charge contactor after a predetermined time has elapsed in a state that the main contactor is closed if the level of the driving signal is an enable level as the determining result.

In the determining of whether the vehicle is in the driving mode in which the vehicle is running, if the speed of the vehicle exceeds a predetermined reference speed, or if a shift gear of the vehicle is a reverse gear, a neutral gear, or a drive gear, the driving mode may be determined.

In the generating of the open event in which the main contactor is opened, the generating of the open event may be determined based on the change of the operation voltage measured in a voltage measurer for measuring the operation voltage supplied to the main contactor.

The contactor management method may further include controlling the main contactor to maintain an open state if the level of the driving signal is a disable level as the determination result.

Advantageous Effects

The present invention may protect the main contactor by maintaining the main contactor in an open state so that the overcurrent (a high inrush current) does not occur when the vehicle is in a parking mode in which the operation is stopped or the driving signal is at a disable level.

In the present invention, if the vehicle is in the driving mode and the driving signal is the enable level, the main contactor may be protected not to not be damaged by the overcurrent by performing the pre-charge using the pre-charge contactor when closing the main contactor.

MODE FOR INVENTION

Figure 1:
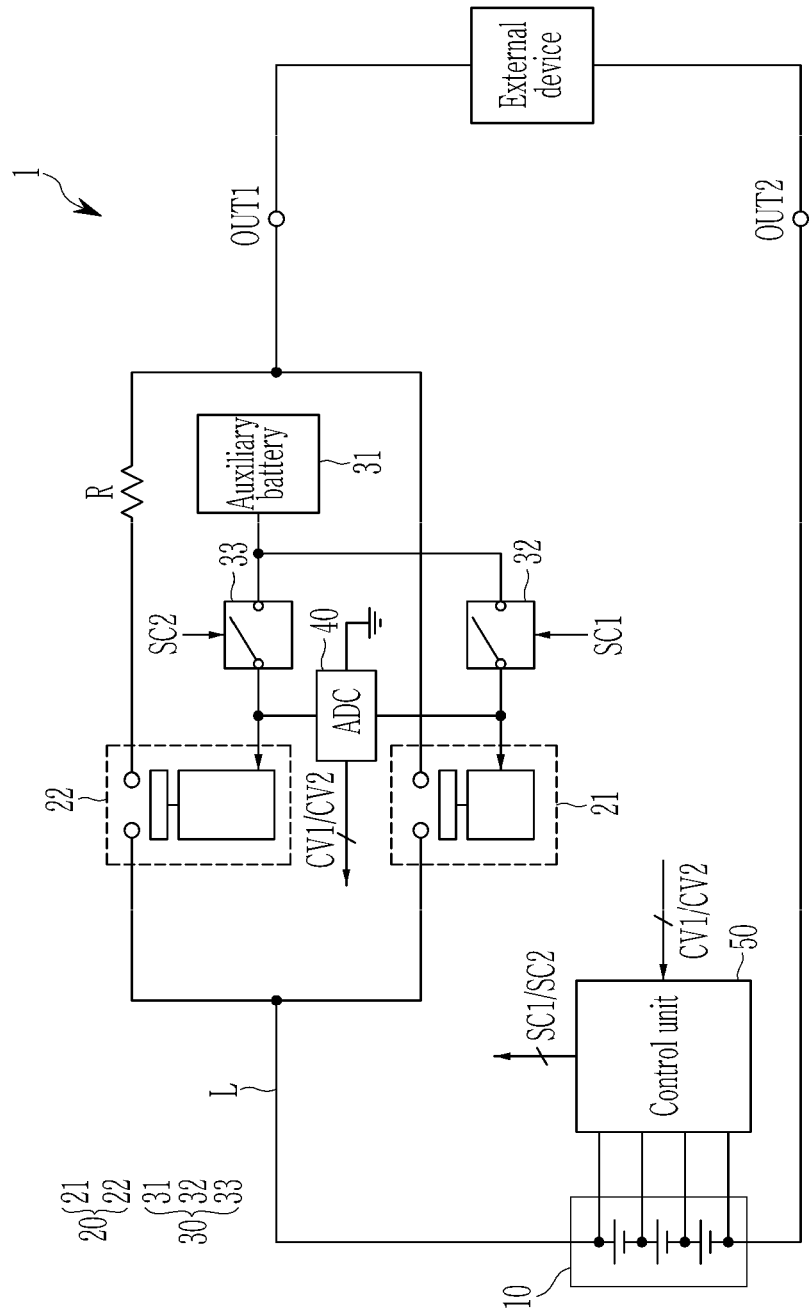
FIG. 1 is a view for explaining a battery system according to an exemplary embodiment.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily make a specification. Therefore, these terms do not have meanings or roles that distinguish them from each other in themselves. Further, in describing embodiments of the present specification, when it is determined that a detailed description of the well-known art associated with the present invention may obscure the gist of the present invention, it will be omitted. In addition, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 is a view for explaining a battery system according to an exemplary embodiment.

Referring to FIG. 1, a battery system 1 includes a battery pack 10, a contactor 20, a driving unit 30, a voltage measuring unit (Analog-Digital Converter; ADC) 40, and a control unit 50.

The battery pack 10 includes a plurality of battery cells electrically connected to each other. In some exemplary embodiments, the battery cell may be a rechargeable battery that is rechargeable. A predetermined number of battery cells are connected in series to form a battery module, and a predetermined number of battery modules are connected in series and in parallel to form a battery pack 10, thereby supplying desired power. A plurality of battery cells are respectively and electrically connected to the control unit 50, for example, a battery management system (BMS) through wiring.

In FIG. 1, the battery pack 10 includes a plurality of battery cells connected to in series and is connected between two output terminals OUT1 and OUT2 of the battery system 1. The contactor 20 is connected to between a positive electrode of the battery pack 10 and the output terminal OUT1. The configurations shown in FIG. 1 and the connection between the configurations are an example and the invention is not limited thereto.

The contactor 20 may be connected between the battery pack 10 and an external device, and may include a main contactor 21 and a pre-charge contactor 22 connected in parallel to the main contactor 21.

The main contactor 21 may be closed according to the first driving signal SC1 of the enable level, and may be opened according to the first driving signal SC1 of the disable level. When the main contactor 21 is closed, the battery system 1 and the external device are electrically connected to each other and the charge or the discharge is performed. For example, when the external device is a load, the discharge operation in which the power is supplied from the battery pack 10 to the load may be performed, and when the external device is a charger, the charge operation in which the battery pack 10 is charged by the charger may be performed. When the main contactor 21 is opened, the battery system 1 and the external device are electrically separated, that is, cut off.

The pre-charge contactor 22 is connected in series with the pre-charge resistor R, may be closed according to the second driving signal SC2 of the enable level, and may be opened according to the second driving signal SC2 of the disable level.

For example, when the main contactor 21 is closed, the power is supplied from the high voltage battery pack 10 to the inverter, and the motor (load) is driven. Before the high voltage battery pack 10 and the capacitor of the inverter are connected by the main contactor 21, the pre-charge contactor 22 makes the capacitor of the inverter pre-charge. Then, the surge current generated when the main contactor 21 and the load are connected is reduced. According to the exemplary embodiment, the pre-charge contactor 22 is first closed before the main contactor 21 is closed, and when a predetermined time elapses in the closed state of the main contactor 21, the pre-charge contactor 22 may be again opened, thereby reducing the surge current.

The contactor 20 is not clearly distinguished from a relay, and it is sometimes used interchangeably. In some cases, it may be called a contactor 20 when opening and closing a circuit of high power (e.g., 5 KW or more), and it may be called a relay when opening and closing a circuit of high power or less (e.g., less than 5 KW). The contactor 20 may be interlocked with an independent circuit, and has a merit that a circuit of a large current may be electrically connected or disconnected due to the operation of a circuit composed of a low voltage system such as 5 V. Also, since a coil part and a contact part in the contactor 20 are insulated and separated, the contactor 20 may be electrically insulated from external devices. Hereinafter, the contactor 20 according to the exemplary embodiment may include a relay.

The driving unit 30 may include an auxiliary battery 31, a first switch 32, and a second switch 33.

The auxiliary battery 31 may supply power to the main contactor 21 and the pre-charge contactor 22. The auxiliary battery 31 may supply the operation voltage of 12 V to each of the main contactor 21 and the pre-charge contactor 22. For example, the auxiliary battery 31 may be a rechargeable battery that is rechargeable. The auxiliary battery 31 may include a DC/DC converter (not shown) for charging the auxiliary battery 31 by lowering the high voltage power discharged from the battery pack 10 to an operation voltage level. As another example, the auxiliary battery 31 may be a primary battery capable of supplying an operation voltage to each of the main contactor 21 and the pre-charge contactor 22.

The first switch 32 is connected between the main contactor 21 and the auxiliary battery 31, and may be switched according to the first driving signal SC1 of the enable level. The first switch 32 controls the electrical connection between the main contactor 21 and the auxiliary battery 31.

When the first switch 32 is turned on according to the first driving signal SC1 of the enable level, the main contactor 21 and the auxiliary battery 31 are electrically connected to each other. Then, the first operation voltage is supplied from the auxiliary battery 31 to the main contactor 21, and the main contactor 21 is closed. When the first switch 32 is turned off according to the first driving signal SC1 of the disable level, the main contactor 21 and the auxiliary battery 31 are electrically disconnected. Then, the first operation voltage is not supplied to the main contactor 21, and the main contactor 21 is opened.

The second switch 33 is connected between the pre-charge contactor 22 and the auxiliary battery 31, and may be switched according to the second driving signal SC2 of the enable level. The second switch 33 controls the electrical connection between the pre-charge contactor 22 and the auxiliary battery 31.

When the second switch 33 is turned on according to the second driving signal SC2 of the enable level, the pre-charge contactor 22 and the auxiliary battery 31 are electrically connected to each other. Then, the second operation voltage is supplied from the auxiliary battery 31 to the pre-charge contactor 22, and the pre-charge contactor 22 is closed. When the second switch 33 is turned off according to the second driving signal SC2 of the disable level, the pre-charge contactor 22 and the auxiliary battery 31 are electrically disconnected. Then, the second operation voltage is not supplied to the pre-charge contactor 22, and the pre-charge contactor 22 is opened.

When the main contactor 21 and the pre-charge contactor 22 are the same type of contactor, the first operation voltage and the second operation voltage may be the same level of voltage. According to the exemplary embodiment, the first operation voltage and the second operation voltage may be a voltage level corresponding to 12 V, but are not limited thereto, and various voltage levels may be set as the operation voltages.

The voltage measuring unit (ADC) 40 measures the first and second operation voltages supplied to each of the main contactor 21 and the pre-charge contactor 22, and may convert the measured first and second operation voltages to first and second digital signals (CV1/CV2). Specifically, the voltage measuring unit (ADC) 40 may convert the analog value of the first and second operation voltages supplied to each of the main contactor 21 and the pre-charge contactor 22 into the first and second digital signals (CV1/CV2) to be transmitted to the control unit 50.

For example, when the first operation voltage of 12 V is supplied to the main contactor 21, the voltage measuring unit (ADC) 40 may transmit the first digital signal CV1 indicating the voltage level of 12 V to the control unit 50. If the first operation voltage is not supplied to the main contactor 21, the voltage measuring unit (ADC) 40 may transmit the first digital signal CV1 indicating the voltage level of 0 V to the control unit 50.

For example, when the second operation voltage of 12 V is supplied to the pre-charge contactor 22, the voltage measuring unit (ADC) 40 may transmit the second digital signal CV2 indicating the voltage level of 12 V to the control unit 50. If the second operation voltage is not supplied to the pre-charge contactor 22, the voltage measuring unit (ADC) 40 may transmit the second digital signal CV2 indicating the voltage level of 0 V to the control unit 50.

The control unit 50 may transmit the first driving signal SC1 and the second driving signal SC2 to the driving unit 30 to control the switching of the main contactor 21 and the pre-charge contactor 22. The control unit 50 may determine whether the main contactor 21 is physically opened or closed based on the change in the first operation voltage measured by the voltage measuring unit (ADC) 40. According to an exemplary embodiment, the control unit 50 may be implemented as a battery management system (BMS) that controls and manages the battery system 1 as a whole.

For example, even when the control unit 50 transmits the first driving signal SC1 of the enable level to the driving unit 30, the first operation voltage may not be actually supplied due to various influences, so that the main contactor 21 may be physically opened. According to the exemplary embodiment, the control unit 50 may determine the physically opened or closed state of the main contactor 21 without error based on the change in the first operation voltage.

When the main contactor 21 is opened, the control unit 50 determines whether to maintain the open state or to re-close the main contactor 21 based on the driving state of the vehicle and the first driving signal SC1. Then, it is possible to prevent the main contactor 21 from being damaged by the overcurrent (a high inrush current).

In addition, when the control unit 50 determines to re-close the main contactor 21, the control unit 50 may perform the pre-charge by using the pre-charge contactor 22 and close the main contactor 21. Then, it is possible to prevent the main contactor 21 from being damaged by the overcurrent.

Figure 2:
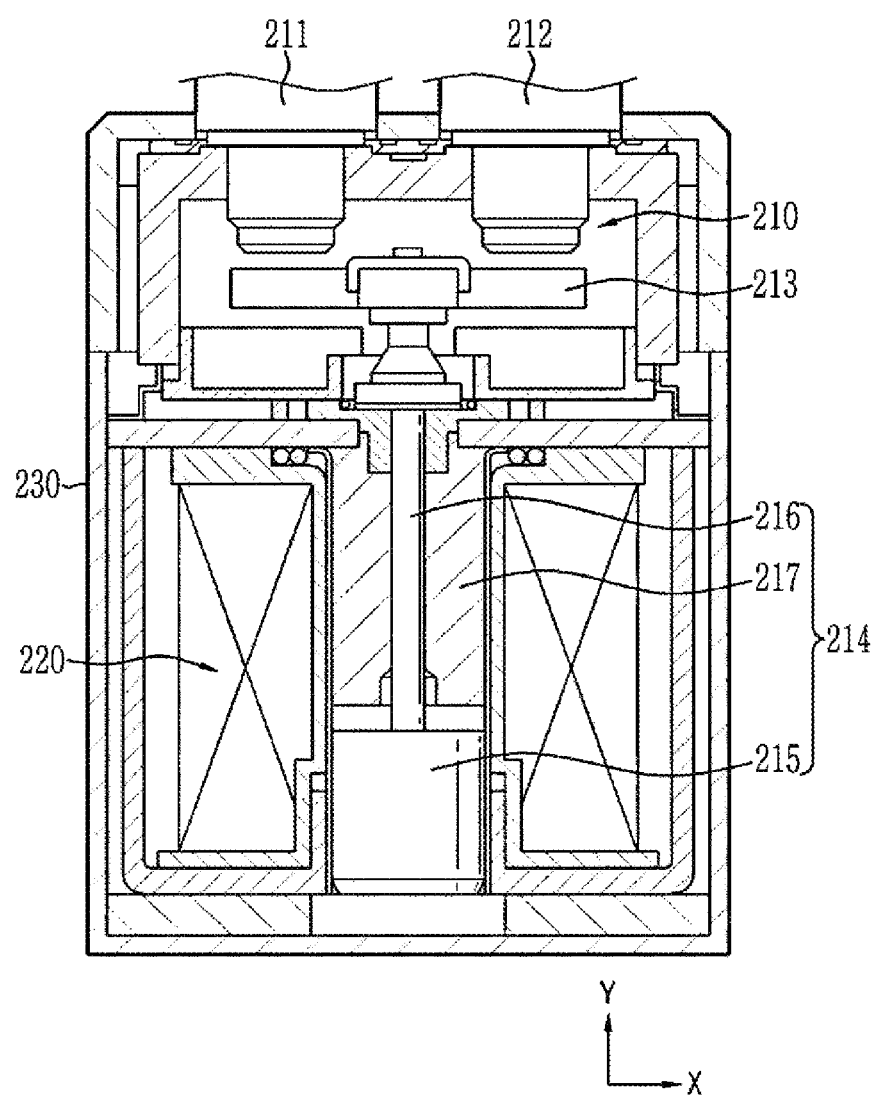
FIG. 2 and FIG. 3 are views for explaining before and after an operation of a contactor according to an exemplary embodiment.
Figure 3:
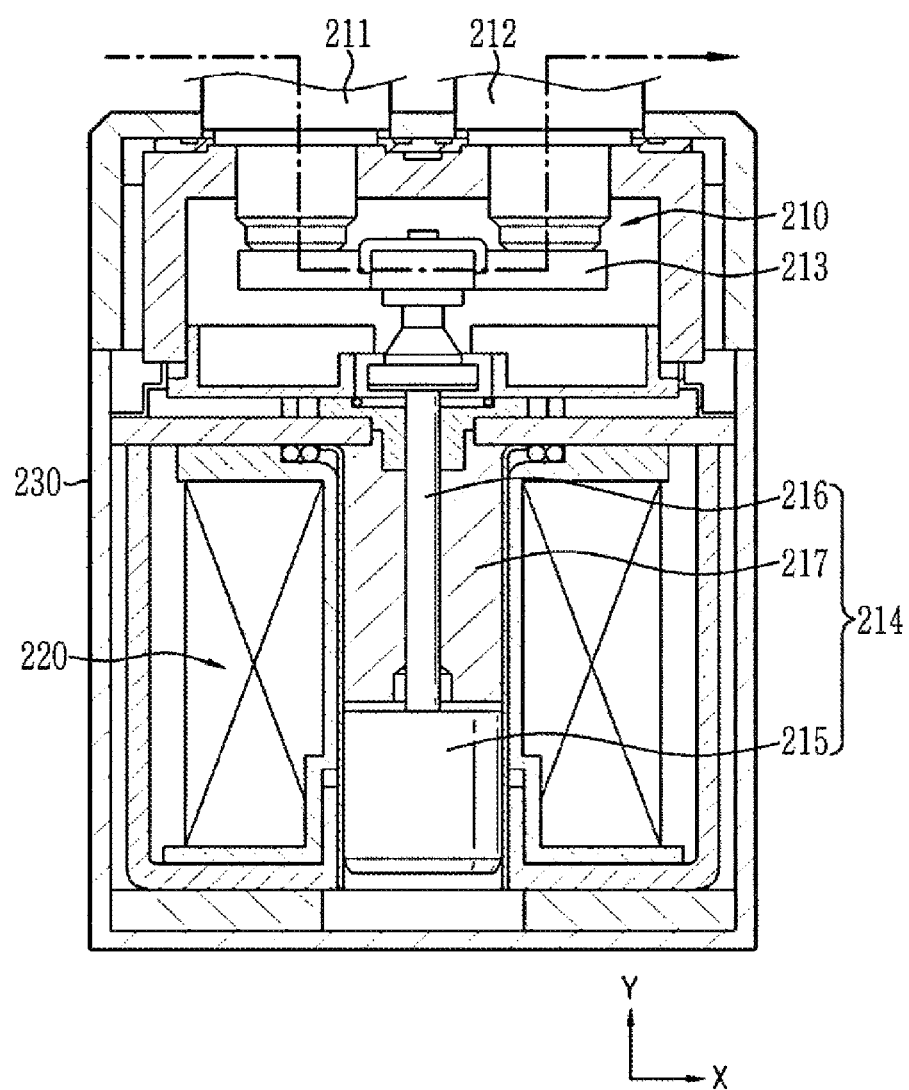

FIG. 2 and FIG. 3 are views for explaining before and after driving of a contactor according to an exemplary embodiment.

Referring to FIG. 1 and FIG. 2, the contactor 20 may control the flow of the current between the battery pack 10 and the external device by connecting or disconnecting a first point and a second point that are disconnected on the power line L.

When the control unit 50 transmits the first control signal SC1 of the enable level to the driving unit 30, the first switch 32 is turned on. Then, the power discharged from the auxiliary battery 31 may be supplied to the main contactor 21. At this time, the level of the power supplied to the main contactor 21 may belong to a range (e.g., 9 V to 16 V) of a rated operation voltage that allows the main contactor 21 to be operated normally.

The voltage measuring unit (ADC) 40 may measure the operation voltage supplied to the main contactor 21 and transmit information indicating the level of the measured operation voltage to the control unit 50. The range of the rated operating voltage may vary depending on the type of the main contactor 21.

When the control unit 50 transmits the first control signal SC1 of the disable level to the driving unit 30, the first switch 32 is turned off. Then, the power discharged from the auxiliary battery 31 is not supplied to the main contactor 21. The voltage measuring unit (ADC) 40 may transmit information indicating a level of a ground voltage to the control unit 50.

Referring to FIG. 2 and FIG. 3, for example, the contactor 20 may be configured as a plunger type including a contact portion 210, a coil unit 220, a plunger unit 214, and a housing 230. However, the contactor 20 is not limited to the plunger type, and may be an electronic switch such as a hinge type of electromagnetic relay, and may include a switch of a type that is operated while pulling an iron piece, and opening or closing a contact point attached to the iron piece when a current flows through the coil and becomes electromagnet.

The contact unit 210 may include a first fixed contact unit 211, a second fixed contact unit 212, and a moving contact unit 213. The first fixed contact unit 211 and the second fixed contact unit 212 are respectively connected to the first and second points that are disconnected from each other on the power line L, and the moving contact unit 213 is positioned facing the first and second fixed contact units 211 and 212 to be spaced apart by a predetermined interval. The moving contact unit 213 may be configured as a metal plate. The moving contact unit 213 is contacted with or separated from the first and second fixed contact units 211 and 212, so that the flow of the large current on the power line L may be controlled. The contact or contact release between the moving contact unit 213 and the first and second fixed contact units 211 and 212 depends on a reciprocating motion in a straight line of the plunger unit 214.

For example, when the switching operation of the contactor 20 is repeated, a degree of fatigue is accumulated, and the contactor 20 is aged due to the accumulation of fatigue and may be welded in the closed state or the opened state. If it falls into the fusion state, the contactor 20 does not operate according to the driving signals SC1 or SC2. Specifically, referring to FIG. 2 and FIG. 3, the moving contact unit 213 may be fused to at least one of the first and second fixed contact units 211 and 212.

The coil unit 220 causes the plunger unit 214 to reciprocate in the straight line by solenoid action. The coil unit 220 is formed in a cylindrical shape, i.e., a hollow shape by winding the coil long, and the plunger unit 214 is disposed to a central passage provided inside the coil unit 220.

The contactor 20 may have a different rated operation voltage according to the specifications of the coil unit 220. For example, the contactor 20 may perform the closing operation when the operation voltage (e.g., 12 V) of a predetermined level is supplied, and may perform the opening operation when the operation voltage is not supplied. The electric vehicle is equipped with a 12 V auxiliary battery 31 in addition to the high voltage battery pack 10 and may be used as a power source for supplying the operation voltage to the contactor The auxiliary battery 31 may be used as a power source for starting the engine or as a power source for various electronic devices such as vehicle headlights.

The plunger unit 214 may move out of the central passage of the coil unit 220 by the solenoid action of the coil unit 220 when the current flows to the coil unit 220. At this time, the moving contact unit 213 and the first and second fixed contact units 211 and 212 are in contact. And when the current to the coil unit 220 is cut off, the plunger unit 214 returns to the original position thereof, and the moving contact unit 213 and the first and second fixed contact units 211 and 212 may be released from the contact.

The plunger unit 214 may include a moving core 215, a plunger shaft 216, and a fixed core 217.

The moving core 215 is a metal block and is provided to be movable by electromagnetic force of the coil unit 220 in an unconstrained state in the central passage. The plunger shaft 216 may extend from the moving core 215 in the length direction of the central passage, and the end thereof engages with the moving contact unit 213 outside the central passage. The moving core 215 and the plunger shaft 216 move together when the current is applied to the coil unit 220.

The fixed core 217 serves to limit the travel distance of the moving core 215 and the plunger shaft 216. The fixed core 217 is fixed in the central passage of the coil unit 220, and has an interior diameter that allows the plunger shaft 216 to pass through but not the moving core 215 because of the hollow shape thereof.

Referring to FIG. 2 and FIG. 3, when electric power is applied to the coil unit 220, the moving core 215 may move in the +Y-axis direction to a position where the moving core 215 abuts the fixed core 217 by the electromagnetic force of the coil unit 220. In this case, the moving distance of the moving core 215 corresponds to a distance between the moving contact unit 213 and the first and second fixed contact units 211 and 212.

Figure 4:
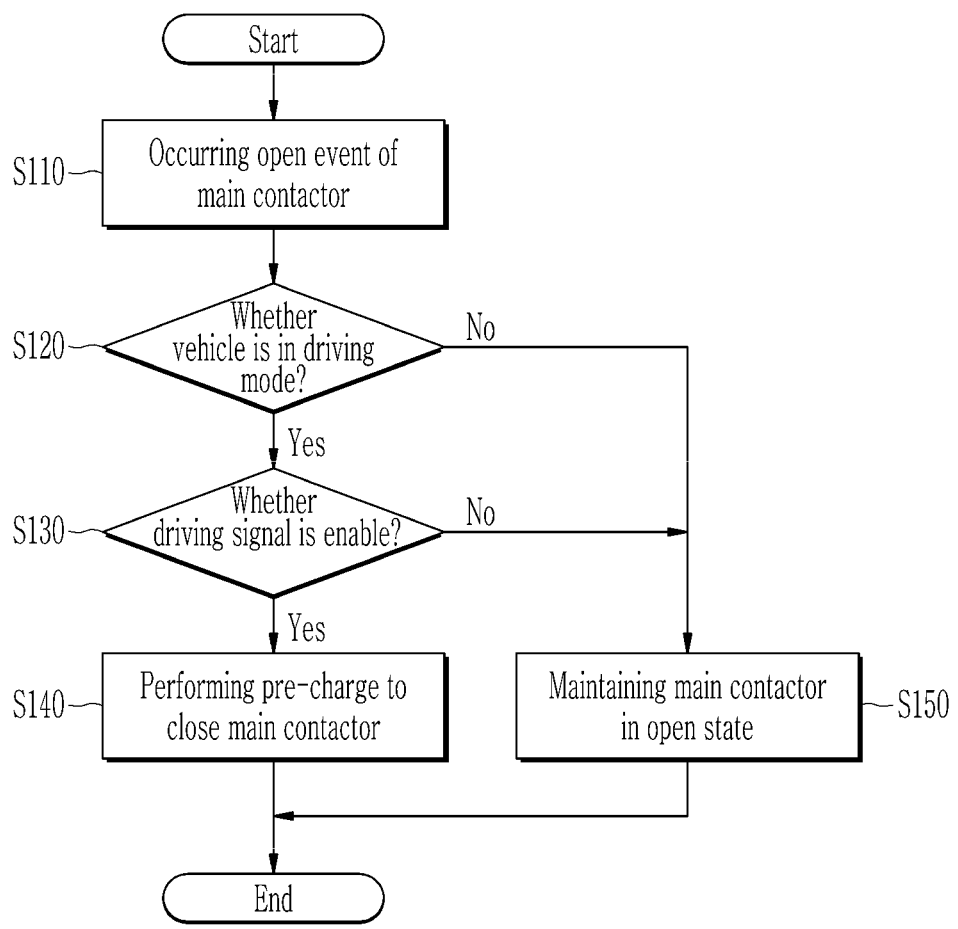
FIG. 4 is a view for explaining a contactor management method according to an exemplary embodiment.

FIG. 4 is a flowchart for explaining a contactor management method according to an exemplary embodiment.

Hereinafter the contactor management method and the battery system that provides the method are described with reference to FIG. 1 to FIG. 4.

Referring to FIG. 4, the control unit 50 determines whether an open event in which the main contactor 21 is opened occurs (S110).

The main contactor 21 is closed when the first operation voltage is supplied, and is opened when the first operation voltage is not supplied. The voltage measuring unit (ADC) 40 may measure the first operation voltage supplied to the main contactor 21 and convert the measured first operation voltage into the first digital signal CV1 to be transmitted to the control unit 50.

For example, when the first operation voltage of 12 V is supplied to the main contactor 21, the voltage measuring unit (ADC) 40 may transmit the first digital signal CV1 indicating the voltage level of 12 V to the control unit 50. If the first operation voltage is not supplied to the main contactor 21, the voltage measuring unit (ADC) 40 may transmit the first digital signal CV1 indicating the voltage level of 0 V to the control unit 50.

The control unit 50 may determine a physical open event of the main contactor 21 based on the change in the first operation voltage measured by the voltage measuring unit (ADC) 40. If the first operation voltage is not supplied to the main contactor 21, the control unit 50 may determine that the open event of the main contactor 21 occurs.

Next, when the open event of the main contactor 21 occurs, the control unit 50 determines whether the vehicle is in a driving mode in which the vehicle is running or in a parking mode in which the driving of the vehicle is stopped (S120).

If the main contactor 21 is suddenly opened in the driving mode in which the vehicle is running, a problem in vehicle safety (e.g., a vehicle being stuck) may occur, so the main contactor 21 needs to be re-closed.

The control unit 50 may determine the driving mode or the parking mode based on the speed or a gear shift of the vehicle. For example, when the speed of the vehicle exceeds a predetermined reference speed (e.g., 4 Km/h), the control unit 50 may determine the driving mode. When the speed of the vehicle is less than or equal to the predetermined reference speed, the control unit 50 may determine the parking mode. For example, if the gear shift is a reverse gear (R), a neutral gear (N), or a drive gear (D), the control unit 50 may determine the driving mode. If the gear shift is the parking gear P, the control unit 50 may determine the parking mode.

Next, in the driving mode (S120, Yes), the control unit 50 determines whether the level of the first driving signal is the enable level (S130).

If the level of the first driving signal is the enable level, it may be determined that the driver has a will to close the main contactor 21. That is, if the vehicle is in the driving mode and the driver wants to close the main contactor 21, the control unit 50 must control the main contactor 21 to be re-closed.

Next, if the level of the first driving signal is the enable level (S130, Yes), the control unit 50 closes the main contactor 21 after closing the pre-charge contactor 22 and performs a pre-charge logic to open the pre-charge contactor 22 after a predetermined time has elapsed in the state that the main contactor 21 is closed (S140).

According to an exemplary embodiment, the control unit 50 does not close the main contactor 21 immediately, but closes the main contactor 21 in the process of executing the pre-charge logic, thereby preventing the main contactor 21 from being damaged by the overcurrent.

Next, if the vehicle is in the parking mode (S120, No) or the level of the first driving signal is the disable level (S130, No), the control unit 50 maintains the main contactor 21 in an open state (S150).

That is, if it is not required that the main contactor 21 is closed, it may be controlled so that overcurrent is not applied to the main contactor 21 in the opened state without closing it.

While this invention has been described in connection with what is presently considered to be practical exemplary embodiments, it is to be understood that the invention is not limited to the disclosed embodiments.

What is claimed is:

1. A battery system, comprising:
    a main contactor connected between a battery pack and an external device;
    a pre-charge contactor connected to the main contactor;
    a voltage measurer measuring an operation voltage supplied to the main contactor; and
    a controller determining an open event of the main contactor based on a change of the operation voltage measured by the voltage measurer,
    wherein the controller,
    in response to the open event occurring, determines a level of a driving signal that controls the operation voltage to be applied to the main contactor in driving mode in which a vehicle is running, and
    in response to the level of the driving signal being an enable level, closes the main contactor after closing the pre-charge contactor and opens the pre-charge contactor after a predetermined time is elapsed in a state that the main contactor is closed.

2. The battery system of claim 1, wherein
    the controller controls the main contactor to maintain an open state in response to the level of the driving signal being a disable level as a determined result.

3. The battery system of claim 1, wherein
    the controller determines that the open event has occurred if the operation voltage supplied to the main contactor is not supplied.

4. The battery system of claim 1, wherein
    the controller determines that the vehicle is in the driving mode if a speed of the vehicle exceeds a predetermined reference speed, or if a gear shift of the vehicle is a reverse gear, a neutral gear, or a drive gear.

5. The battery system of claim 1, further comprising
    a driver receiving the driving signal from the controller and supplying the operation voltage to the main contactor according to the driving signal.

6. The battery system of claim 5, wherein
    the controller is a battery management system (BMS) controlling opening or closing of the main contactor by transmitting the driving signal to the driver.

7. The battery system of claim 1, wherein
    the voltage measurer is an analog-to-digital converter (ADC) converting the operation voltage into a digital signal to be transmitted to the controller.

8. A contactor management method for managing a main contactor by controlling the main contactor connected between a battery pack and an external device and a pre-charge contactor connected to the main contactor through a controller, comprising:
    generating an open event in which the main contactor is opened;
    determining whether a vehicle is in a driving mode in which the vehicle is running if the open event occurs;
    determining a level of a driving signal controlling an operation voltage to be applied to the main contactor in the case of the driving mode; and
    closing the main contactor after closing the pre-charge contactor and opening the pre-charge contactor after a predetermined time has elapsed in a state that the main contactor is closed if the level of the driving signal is an enable level as the determining result.

9. The contactor management method of claim 8, wherein
    in the determining of whether the vehicle is in the driving mode in which the vehicle is running, if a speed of the vehicle exceeds a predetermined reference speed, or if a shift gear of the vehicle is a reverse gear, a neutral gear, or a drive gear, the driving mode is determined.

10. The contactor management method of claim 8, wherein:
    in the generating of the open event in which the main contactor is opened, the generating of the open event is determined based on a change of the operation voltage measured in a voltage measurer for measuring the operation voltage supplied to the main contactor.

11. The contactor management method of claim 8, further comprising
    controlling the main contactor to maintain an open state if the level of the driving signal is a disable level as the determination result.

* * * * *

UNITED STATES PATENT AND TRADEMARK OFFICE
CERTIFICATE OF CORRECTION

| | |
|---|---|
| PATENT NO. | : 11,999,264 B2 |
| APPLICATION NO. | : 17/768889 |
| DATED | : June 4, 2024 |
| INVENTOR(S) | : Kim |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 181 days.

Signed and Sealed this
Thirteenth Day of May, 2025

Coke Morgan Stewart
*Acting Director of the United States Patent and Trademark Office*